A. G. MEAD.
PRESS.
APPLICATION FILED DEC. 26, 1905.
954,449.
Patented Apr. 12, 1910.
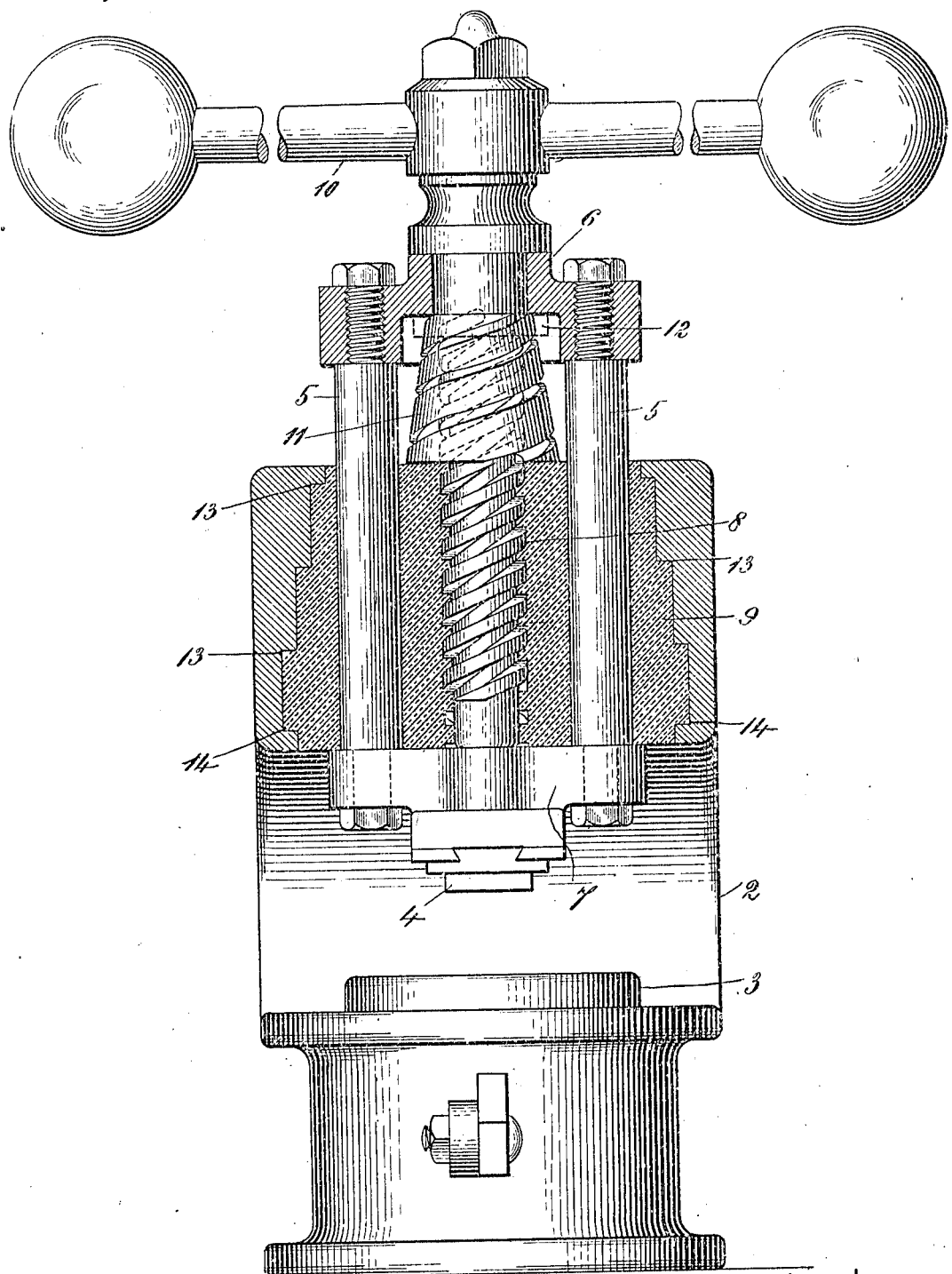
WITNESSES
Joseph T. Brennan
Grace E. Gibbons
INVENTOR
Albert G. Mead,
By E. D. Chadwick,
Attorney.

UNITED STATES PATENT OFFICE.

ALBERT G. MEAD, OF SOMERVILLE, MASSACHUSETTS.

PRESS.

954,449.  Specification of Letters Patent.  Patented Apr. 12, 1910.

Application filed December 26, 1905. Serial No. 293,194.

*To all whom it may concern:*

Be it known that I, ALBERT G. MEAD, a citizen of the United States, and resident of Somerville, in the county of Middlesex and State of Massachusetts, have invented certain new and useful Improvements in Presses, of which the following is a specification.

My invention is particularly applicable to hand presses for dying, punching, etc., the object of the invention being to provide a simple, durable and efficient press of this type which will be less expensive to construct than those now in use and will have other advantageous features hereinafter described.

A hand press embodying my invention is illustrated in the accompanying drawings, in which the figure is a front elevation of the press with the upper portion of the frame shown in vertical transverse section.

Referring to the drawings, 2 represents the frame of the press and 3 the bed plate, fixed die or the like, carried thereby. These parts may be of any suitable construction such as is usual in presses of this character, except that in my press the upper portion of the frame which overhangs the bed plate has an open space or recess extending vertically through it which is formed in it when the frame is cast. In this recessed upper portion of the frame is mounted to slide vertically a head adapted to carry at its lower end a movable die 4 or other part or tool, according to the nature of the work which the press is designed to do, which head is composed of two parallel guiding rods or bars 5 connected at their upper and lower ends by cross bars or yokes 6 and 7. This head is forced downward, in operation, by suitable means such as a screw 8 which passes freely through the upper cross bar 6 and bears at its lower end upon the upper side of the lower cross bar 7, closely adjacent to the movable die or other part 4 and directly behind the same with reference to the direction of its operative movement. The threads of the screw 8 are fitted to and coöperate with similar interior threads formed in a mass of Babbitt metal 9, which fills the aforesaid recess in the frame and in which also the rods 5 slide and by which they are guided, these rods being of sufficient length to provide for the necessary downward movement of the head and having a long bearing in the babbitt. The screw 8 is operated by the usual hand lever 10 secured to its upper end, or otherwise, and the movable head is lifted when the screw is retracted by means of a spring 11 located between the upper cross bar 6 and the fixed frame below it, or in case considerable power is likely to be required for raising said head the screw may be provided with a collar 12 (shown in dotted lines) adapted to engage the under side of said cross bar 6, in which case the movable head will be positively lifted by the retraction of the screw.

In constructing this press I prefer to make the guide rods 5 out of drawn steel rods, which require no finishing other than the turning down and threading of their extremities after they have been cut, and after the parts of the movable head have been assembled I place said head in the opening in the frame, with the upper die resting in operative relation upon the lower die in order to insure absolute accuracy in their alinement, and I then place in position in the head a screw very slightly larger than the one which is to be used, the lower end of which is properly centered in any suitable manner. The Babbitt metal 9 is then cast about the assembled head and screw and fills the spaces around these parts and between them and the walls of the opening in which they are located, whereupon said parts are forced loose and taken apart. The holes left by the rods 5 are reamed slightly to provide for the necessary freedom of movement of said rods, and the pattern screw is replaced by the screw 8 which is to form a part of the press and which, being slightly smaller than the pattern screw, will turn readily in the threads cast in the babbitt. The parts are then assembled and the press is ready for use. The opening in the frame is preferably formed with faces or shoulders 13 to resist the upward thrust imparted to the babbitt under the pressure developed in operation, and an opposed shoulder 14 is provided at the lower end of said opening in order to prevent the babbitt from being forced out of the latter by the pressure of the spring 11 or otherwise.

From the foregoing description it will be noted that my press may be constructed at a minimum of expense, since the guides which it has heretofore been necessary to finish with great care and accuracy require in my press practically no finishing at all, and the same is true of the fixed threads in which the screw works. It will also be seen that the screw exerts its pressure upon the movable head immediately behind the die or other tool carried thereby, at the point where this pressure is most directly and advantageously applied, and since this point is located between and in advance of the guides which control the movement of said head, the result is that no compressing or torsional strains or other deforming pressures can possibly be applied to the movable head. The parallelism of the guides is thus preserved and the wear on the same is minimized, so that a very durable press results.

Although the Babbitt metal in which the parts 5 and 8 operate is preferably cast in a single integral mass, as shown, yet it will be evident that this is not essential.

I claim as my invention:

1. A press comprising a frame providing a base and a head portion opposed thereto, a tool-carrying head comprising parallel guides connected by cross bars and mounted to slide toward and from the base in bearings carried by said head portion, and operating means for said head arranged to exert a thrust upon the rear face of the front end of the head, between the guides and in advance of the bearings for the same, with reference to the direction of the operative movement of said head.

2. A press comprising a frame providing a base and a head portion opposed thereto, a tool-carrying head comprising parallel guides connected by cross bars and mounted to slide toward and from the base in bearings carried by said head portion, and a screw located between said guides and passing loosely through the rear cross bar, with reference to the direction of operative movement of the head, said screw having a threaded engagement with said head portion and bearing at its forward end against the rear face of the front cross bar of the tool-carrying head, in advance of the bearings for said guides.

3. A press comprising a frame providing a supporting base and an opposed head portion, said head portion having an opening extending through the same, a tool-carrying head located in said opening and comprising parallel guide rods connected by cross bars, and a screw located between the guide rods and bearing at its forward end upon the rear face of the front cross bar, with reference to the direction of operative movement of said tool-carrying head, the spaces around said rods and screw and between the same and the walls of said opening being filled with Babbitt metal cast into said spaces and forming bearings for said rods and screw.

4. A press comprising a frame providing a base and an opposed head portion, said head portion having an opening formed therein and the walls of said opening being provided with inwardly-projecting shoulders, a tool-carrying head located in said opening and comprising parallel guide rods connected by cross bars, and a screw located between the guide rods and bearing at its forward end upon the rear face of the front cross bar, with reference to the direction of operative movement of said tool-carrying head, the spaces around said rods and screw and between the same and the walls of said opening being filled with Babbitt metal cast into said spaces and abutting against said shoulders, substantially as described.

In testimony whereof, I have hereunto subscribed my name this first day of December, 1905.

ALBERT G. MEAD.

Witnesses:
E. D. CHADWICK,
C. D. WOODBERRY.